United States Patent
Bellamkonda et al.

(10) Patent No.: US 7,035,843 B1
(45) Date of Patent: Apr. 25, 2006

(54) EVALUATION OF DATABASE HIERARCHICAL CUBES BY NESTING ROLLUP OPERATORS ASSOCIATED WITH MULTIPLE GROUPINGS

(75) Inventors: Srikanth Bellamkonda, Sunnyvale, CA (US); Abhinav Gupta, Palo Alto, CA (US); Andrew Witkowski, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 563 days.

(21) Appl. No.: 10/077,828

(22) Filed: Feb. 15, 2002

(51) Int. Cl.
*G06F 17/30* (2006.01)

(52) U.S. Cl. .......................... 707/3; 707/100
(58) Field of Classification Search ................ 707/1–7, 707/100–104.1, 200–201
See application file for complete search history.

(56) References Cited

U.S. PATENT DOCUMENTS

| | | | |
|---|---|---|---|
| 5,469,568 A | 11/1995 | Schiefer et al. | |
| 5,649,181 A * | 7/1997 | French et al. | 707/3 |
| 5,675,785 A * | 10/1997 | Hall et al. | 707/102 |
| 5,822,751 A * | 10/1998 | Gray et al. | 707/3 |
| 5,832,475 A * | 11/1998 | Agrawal et al. | 707/2 |
| 5,940,819 A * | 8/1999 | Beavin et al. | 707/2 |
| 5,943,666 A | 8/1999 | Kleewein et al. | |
| 5,963,936 A * | 10/1999 | Cochrane et al. | 707/3 |
| 6,141,655 A * | 10/2000 | Johnson et al. | 707/2 |
| 6,298,342 B1 | 10/2001 | Graefe et al. | |
| 6,341,281 B1 | 1/2002 | MacNicol et al. | |
| 6,345,267 B1 | 2/2002 | Lohman et al. | |
| 6,493,699 B1 * | 12/2002 | Colby et al. | 707/2 |
| 6,574,623 B1 * | 6/2003 | Leung et al. | 707/5 |
| 6,574,673 B1 * | 6/2003 | Hari et al. | 719/310 |
| 6,763,352 B1 * | 7/2004 | Cochrane et al. | 707/4 |
| 6,775,681 B1 * | 8/2004 | Ballamkonda et al. | 707/102 |
| 6,775,682 B1 * | 8/2004 | Ballamkonda et al. | 707/102 |
| 2003/0208484 A1 | 11/2003 | Chang et al. | |
| 2004/0122844 A1 * | 6/2004 | Malloy et al. | 707/102 |
| 2005/0027690 A1 * | 2/2005 | Zhang et al. | 700/3 |

OTHER PUBLICATIONS

Jim et al., Data cube: A relational aggregation operator generalizing group-By, cross-tab, and sub-totals, published on Nov. 6, 1996.*

(Continued)

*Primary Examiner*—Srirama Channavajjala
(74) *Attorney, Agent, or Firm*—Hickman Palermo Truong & Becker LLP; John D. Henkhaus

(57) ABSTRACT

Methods are provided for efficiently evaluating database queries including multiple rollup operators. With the computation of grouping identifiers to distinguish grouping levels of each rollup operator, evaluation of database queries that include concatenation of rollup operators includes nesting of the rollup operators and includes the grouping identifiers as sorting keys for subsequent processing. Furthermore, to optimize the query evaluation process, the order in which the rollup operators are computed can be determined based on cardinalities that estimate the number of records generated by each rollup operator, and parallel evaluation can be utilized by partitioning data records between rollup operator processing stages based on the grouping keys associated with the rollup operators that are not being processed at the next stage. If the query includes an algebraic aggregate function, the algebraic function is represented as distributive functions, which are propagated through the evaluation stages and used to compute the algebraic function at the final rollup stage.

28 Claims, 8 Drawing Sheets

OTHER PUBLICATIONS

N.Colossi et al. Relational extensions for OLAP, IBM systems journal, vol. 41, No. 4, 2002, pp 714-731.*
Chris stolte et al., Query, analysis, and visulaization of Hierarchically structured data using polaris, proceedings of the ACM, SIGKDD international conference on knowledge discovery and data mining 2002.*
Hyperion, "Analytical processing: a comparision of multidimensional and SQL-based approaches", 2000, 10 pages.*
Gayatri Sathe et al. "Intelligent rollups in multidimensional OLAP data", Proceedings of the 27th VLDB conference, 2001, 10 pages.*
Sunita Sarwagi, "user-adaptive exploration of multidimensional data", proceedings of the 26th VLDB conference, 2000, pp 307 316.*
Nico Brandt et al. "Mining multi-relational data deliverable D15",Jun. 22, 2001, pp 1-41.*
Bishwaranjan, Bhattacharjee et al. "Efficient query processing for multi-dimensionally clustered tables in DB2",proceedings of the $29^{th}$ VLDB conference, 2003, 12 pages.*
Yannis Sismanis et al. "Hierarchical dwarfs for the rollup cube", DOLAP '03 Nov. 2003, pp 17-24.*
Colossi et al. "relational extensions for OLAP", IBM systems journal, vol. 41, No. 4, 2002, 00 714-731.*
Panos Vassilliadis, "Modeling Multidimensional Databases, Cubes and Cube operations", 10th International conference on scientific and statistical database management, 1998, 11 pages.*

* cited by examiner

GROUP BY (division, family, class, product, country, state, city)
rollup(year, quarter, day)

| GROUP | COUNTRY | STATE | CITY | DIVISION | FAMILY | CLASS | PRODUCT | YEAR | QUARTER | DAY | gid_I |
|---|---|---|---|---|---|---|---|---|---|---|---|
| G11 | 0 | 0 | 0 | 0 | 0 | 0 | 0 | 0 | 0 | 0 | 0 |
| G12 | 0 | 0 | 0 | 0 | 0 | 0 | 0 | 0 | 0 | 1 | 1 |
| G13 | 0 | 0 | 0 | 0 | 0 | 0 | 0 | 0 | 1 | 1 | 3 |
| G14 | 0 | 0 | 0 | 0 | 0 | 0 | 0 | 1 | 1 | 1 | 7 | gid_I =
grouping_id(country, state, city, division, family, class, product, year, quarter, day)

FIG. 3

EVALUATION OF DATABASE HIERARCHICAL CUBES BY NESTING ROLLUP OPERATORS ASSOCIATED WITH MULTIPLE GROUPINGS

CROSS REFERENCE TO RELATED APPLICATIONS

This application is related to commonly owned U.S. patent application Ser. No. 10/084,642 filed on Feb. 26, 2002, entitled "Evaluation of Rollups With Distinct Aggregates By Using Sequence of Sorts and Partitioning By Measures", and U.S. patent application Ser. No. 10/084,597 filed on Feb. 26, 2002, entitled "Evaluation of Grouping Sets By Reduction to Group-By Clause, With or Without a Rollup Operator, Using Temporary Tables", which are incorporated by reference herein in their entirety for all purposes.

FIELD OF THE INVENTION

The present invention relates generally to database management systems and, more specifically, to techniques for efficiently evaluating database queries including hierarchical cubes.

BACKGROUND OF THE INVENTION

In a database management system (DBMS), data is stored in one or more data containers, each container contains records, and the data within each record is organized into one or more fields. In relational database management systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Database management systems retrieve information in response to receiving queries that specify the information to retrieve. In order for a database management system to understand the query, the query should conform to a database language recognized by the database management system, such as the Structured Query Language (SQL).

In an OLAP (on-line analytical processing) environment or a data warehousing environment, data is often organized into a star schema. A star schema is distinguished by the presence of one or more relatively large tables and several relatively smaller tables. Rather than duplicating the information contained in the smaller tables, the large tables contain references (foreign key values) to rows stored in the smaller tables. The larger tables within a star schema are referred to as "fact tables", while the smaller tables are referred to as "dimension tables". Typically, each dimension has "levels" which correspond to columns of the dimension table, which are organized in a hierarchical manner. For example, a TIME dimension might consist of the levels year, quarter, month, and day, corresponding to columns of the TIME table. The hierarchical organization is such that years consist of quarters, quarters consist of months, and months consist of days.

Aggregate Function

An important function for data generation and retrieval performed by a database management system is the generation of aggregated information. Aggregated information is information derived by applying an aggregate function to the values in a column of a subset of rows in a table or on the result of a join of two or more tables. Examples of aggregate functions are functions that sum values, calculate averages, and determine minimum and maximum values. The column that contains the values to which an aggregate function is applied is referred to as the measure.

The subsets of rows to which an aggregate function is applied are determined by values in "group-by" columns. The aggregate information generated by a database management system is presented as a result set having the group-by column(s) and the aggregated measure column. In particular, the result set has one row for each unique value in the group-by column. Each row in the result set corresponds to the group of rows in the base table containing the value for the group-by column of the row. The measure column in the row contains the output of the aggregate function applied to the values in the measure column of the group of rows.

Aggregate information is generated by a database management system in response to receiving an aggregate query. An aggregate query specifies a group-by column, the aggregate measure column, and the aggregate function to apply to the measure values. The following query is provided as an illustration.

SELECT d, SUM(s) sum_s
FROM t
GROUP BY d

Table t contains data representing the sales of an organization. Each row represents a particular sales transaction. For a particular row in table t, column d contains the date of the sales transaction, and s contains the sale amount.

The SELECT clause contains "SUM(s)", which specifies that the aggregate function "sum" is to be applied to the values in column s (aggregate measure) of table t. The query also includes the group-by clause "GROUP BY d", which denotes column d as the group-by column.

Execution of this query generates a result set with a column for d and a column for sum (s). A particular row in the result set represents the total sales (s) for all sale transactions in a given day (d). Specifically, for a particular row in the result set, d contains a unique date value from table t for column d. Column sum_s contains the sum of the sales amount values in column s for the group of rows from t that have the unique date value in column d.

It is often useful to generate aggregate information grouped by multiple columns. For example, table t may also contain column r, a column containing values representing regions. It is may be useful to generate a result set that summarizes sales by region, and for each region, sales date. Such a result set may be generated by referencing column r and d in the group-by clause, as illustrated by the following query.

SELECT d, r SUM (s)
FROM t
GROUP BY r, d

Often, a query that includes an aggregate function specifies that information from one table is to be aggregated by groupings defined by keys of another table.

Rollup Operator

A useful way to provide aggregate information is to generate one result set that groups data by various combinations of columns. For example, a result set may contain a set of rows grouped by region and date, and a set of rows grouped only by region. Such a result set may be generated by submitting a query that includes multiple subqueries operated upon by the union operator. While union queries may be used to generate a result set with multiple groupings, they can be very tedious to write. The programmer of the subquery must write a subquery for each desired grouping, which may become extraordinarily burdensome when the number of groupings desired is relatively large. Furthermore, such queries are very inefficient to execute, as some tables are accessed multiple times.

To avoid this burden, SQL defines extended group-by operations. Extended group-by operations include cube, rollup, and grouping sets. The group-by operators are used to specify groupings that include various combinations of the columns specified as arguments to the operators. For example, using the rollup operator, a query may be written as follows.

SELECT year, quarter, month, SUM(sales)
FROM fact.time
WHERE fact.tkey=time.tkey
GROUP BY rollup(year, quarter, month).

According to techniques that employ sort-based algorithms, execution of this query first joins the table fact with the table time to get the values of year, quarter, and month for each fact table row. The joined data is sorted on grouping keys (columns), i.e., on (year, quarter, month) for the current example. Next, the query aggregates the sorted data on one column (sales). The rollup operator aggregates data across levels specified as the keys (or columns) of the rollup operator, specified in the GROUP BY line. For example, "GROUP BY rollup(year, quarter, month)" produces aggregated results on the following groups:

(year, quarter, month);
(year, quarter);
(year); and
( ).

Note that a rollup on n columns produces n+1 groups. The grand total (referred to as the highest or coarsest) group is the ( ) grouping, and the base (referred to as the lowest or finest) group is the (year, quarter, month) grouping.

Hierarchical Cube

Concatenation of multiple rollup operators in a database query results in a hierarchical cube. A hierarchical cube is a data set where the data is aggregated along hierarchies of dimensions. Hierarchical cube computation is common and useful in data warehousing applications and business intelligence processing. For example, a query that includes a hierarchical cube, that is, a query that includes a GROUP BY clause that includes multiple rollup operators, is illustrated in the following example.

SELECT year, quarter, month, region, state SUM(sales)
FROM fact, time, geography
WHERE fact.timekey=time.timekey and fact.geographykey=geography.geographykey
GROUP BY rollup(year, quarter, month), rollup(region, state).

Execution of this query aggregates data according to the aggregate function, SUM(sales), across levels of multiple hierarchies. In other words, execution of the query will perform a cross-product on the aggregations generated by each rollup operator.

For example, rollup(year, quarter, month) produces the following groupings:

(year, quarter, month);
(year, quarter);
(year);
( ).

Furthermore, rollup(region, state) produces the following groupings:

(region, state);
(region);
( ).

Hence, concatenation of the previous rollups produces the following twelve groupings:

(year, quarter, month, region, state);
(year, quarter, month, region);
(year, quarter, month);
(year, quarter, region, state);
(year, quarter, region);
(year, quarter);
(year, region, state);
(year, region);
(year);
(region, state);
(region);
( ).

A hierarchical cube specification with n number of rollups $(R\_1, \ldots R\_n)$, with each rollup $R\_i$ having $a\_i$ number of keys, the number of result groupings is $(a\_1+1)*(a\_2+1)* \ldots *(a\_n+1)$. Prior approaches to evaluating a query that includes a hierarchical cube will scan and sort the base table as many times as the number of resulting groupings. For example, using this approach, one would require twelve scans and sorts to compute the above query.

Based on the complexity of computing hierarchical cube groupings, it is clearly desirable to provide a scalable mechanism for efficiently computing database queries containing concatenated rollup operators, or hierarchical cubes.

SUMMARY OF THE INVENTION

Methods are provided for efficiently evaluating database queries that include hierarchical cube computations, that is, a concatenation of rollup operators.

According to one embodiment, utilizing nesting of the rollup operators, results for each rollup operator other than the first computed are generated based on the result records from the previous rollup operator. According to one embodiment, which can be implemented to augment the nested rollup method or can be used to benefit other applications, grouping identifiers are computed to uniquely identify each grouping level of each rollup operator. In addition, computation of rollup operators other than the first computed, sort their input records based on the associated grouping keys and on the grouping identifier that identifies levels produced by previous rollup operators. Furthermore, according to one embodiment, the grouping identifiers are computed as integers that represent bit-vectors, wherein each bit represents a grouping field key of a rollup operator.

In one embodiment, to reduce the computational cost of sorting records, cardinalities are computed for each rollup operator based on the number of unique values for grouping keys specified in the rollup operator, taking into account the additional rows (corresponding to higher levels) generated by the rollup operator. An order of evaluation of rollup operators is determined based on the cardinalities, and the rollup operators are evaluated according to the order that is determined, where rollup operators with lower cardinalities are evaluated prior to rollup operators with higher cardinalities.

In database queries that additionally include algebraic aggregate functions, according to one embodiment the algebraic function is represented as distributive aggregate functions which are computed for each rollup operator and propagated to the next rollup operator. With computation of the final rollup operator, the algebraic aggregate function is computed based on the distributive aggregate function values that have been propagated through the evaluation process.

Parallel evaluation techniques are used to gain additional computational efficiencies, and techniques to employ in a parallel evaluation scheme are also described. Using parallel evaluation, and according to one embodiment, for each rollup operator other than the first computed, data records from a previous rollup result are partitioned in part by grouping field keys associated with the rollup operators of the current rollup, excluding any other rollup operators to be computed. Furthermore, if grouping identifiers are being used, the partitioning of records is also by the grouping identifiers computed at the previous stage of evaluation.

Various implementations of the techniques described are embodied in methods, apparatus, and in computer-readable media.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a table illustrating the computation of grouping distinguishers;

DETAILED DESCRIPTION

Figure 1:
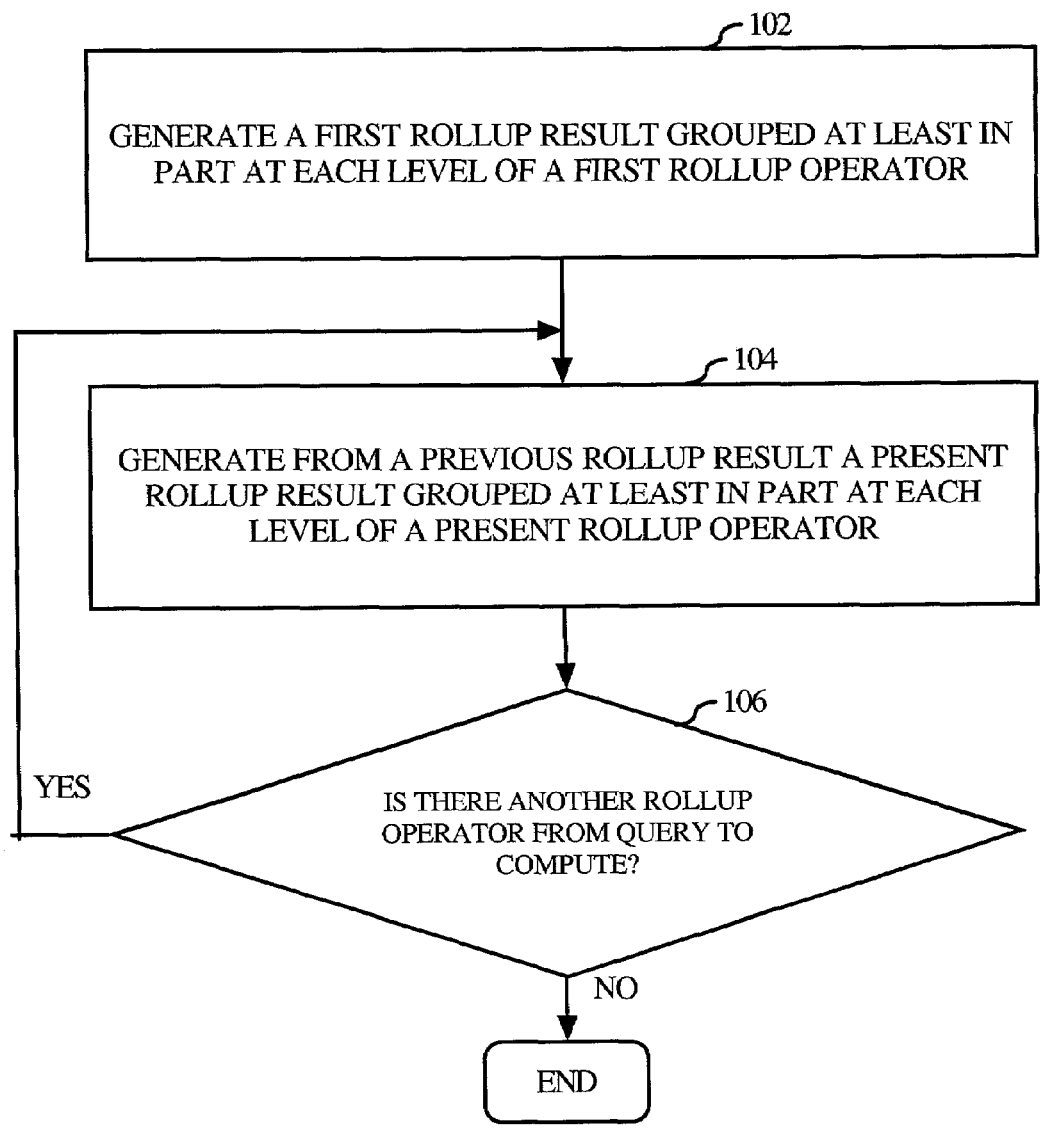
FIG. 1 is a flowchart illustrating a method for evaluating a query with a concatenation of rollup operators (a hierarchical cube)

A method and system for efficiently evaluating database queries including concatenated rollup operators, or hierarchical cubes, are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Computing a Hierarchical Cube by Nesting Rollups

Following is an example of a query that includes concatenation of multiple rollup operators (a hierarchical cube), in addition to multiple dimension tables and multiple aggregate functions.

```
SELECT year, quarter, day,
    division, family, class, product,
    country, state, city,
    sum(sales) sum_sales
    avg(profit) avg_profit
FROM fact, time, product, geography
WHERE fact.timekey=time.timekey and
    fact.productkey=product.productkey and
    fact.geographykey=geography.geographykey
GROUP BY rollup(year, quarter, day),
    rollup(division, family, class, product),
    rollup(country, state, city).
```

Evaluation of this query, according to an embodiment of the invention, is performed by nesting the rollup operators. The techniques described herein are described in terms of sort-based algorithms, which sort data records in order to group them for computation of aggregate functions that are included in a query. Note that there are methods for computing aggregate functions other than sort-based, and the invention is independent of the method used to compute aggregation. For example, there are hash-based aggregation schemes for simple GROUP BYs, which cannot be used for GROUP BY ROLLUP queries without re-hashing. With sort-based aggregation, each rollup can be evaluated with a single sort. Hence, sort-based algorithms are used herein for purposes of example and not for purposes of limiting the scope of the invention. Thus, using nested rollups, the number of sorts is equal to the number of rollups in the query. This is in contrast to scanning and sorting records for each resulting grouping specified by the hierarchical cube. Thus, evaluation of the preceding example by nesting rollups performs three sorts. Furthermore, this technique alleviates the need to perform grouping set transformations between rollup operators and the need to use temporary tables, as described in U.S. patent application Ser. No. 10/084,597, entitled "Evaluation of Grouping Sets by Reduction to Group-By Clause, With or Without a Rollup Operator, Using Temporary Tables". Hence, a computationally efficient evaluation of the query results.

With the nested rollup approach, the preceding query can be evaluated according to the following execution model:

(1) the rollup (year, quarter, day) is performed on the base data records;

(2) the rollup (division, family, class, product) is performed on the results of the rollup (year, quarter, day); and (3) the rollup (country, state, city) is performed on the results of the rollup (division, family, class, product).

Rollup (year, quarter, day) is referred to herein as the time rollup operator because it rolls up along the time hierarchical dimension. Similarly, rollup (division, family, class, product) is referred to as the product rollup operator, and rollup (country, state, city) is referred to as the geography rollup operator.

Generally, if R_N refers to a rollup on dimension (or table) "N" and there are "n" levels in the hierarchy of a dimension, then when a second rollup is computed from a first rollup, the different levels of aggregation produced by the first rollup need to be distinguished. For example, in a query comprising four rollups, R_I, R_J, R_K, R_L, each of the levels of R_I needs to be distinguishable when computing R_J. The number of aggregate levels in R_I is "i+1" because a rollup on "n" columns produces "n+1" levels. Thus, the number of aggregate levels generated when rollup R_J is computed from rollup R_I is (j+1)*(i+1), because the data is rolled up along dimension "J" for each level of "I". Similarly, when rollup R_K is computed from rollup R_J, the data is rolled up along dimension "K" for each level produced by preceding rollups. The number of aggregate levels generated is "(k+1)*(j+1)*(i+1)." Similarly, rollup R_L processes "(k+1)*(j+1)*(i+1)" levels to generate "(l+1)*(k+1)*(j+1)*(i+1)" levels of aggregation.

Referring back to the exemplary query, the computation of rollup(year, quarter, day) produces four groupings, illustrated as:
 G11: (division, family, class, product, country, state, city, year, quarter, day);
 G12: (division, family, class, product, country, state, city, year, quarter);
 G13: (division, family, class, product, country, state, city, year);
 G14: (division, family, class, product, country, state, city).

Computation of the next rollup, i.e., rollup (division, family, class, product), rolls the data up on the product dimension according to the rollup operator, in each of the levels listed above (G11, G12, G13, G14). This rollup produces twenty (20) groupings. That is, five levels of the product dimension rolled up on each of four levels of the time dimension. For the sake of brevity, the groupings produced by the rollup of the product dimension, on G13 only, are shown below.
 G2113: (year, country, state, city, division, family, class, product);
 G2213: (year, country, state, city, division, family, class);
 G2313: (year, country, state, city, division, family);
 G2413: (year, country, state, city, division);
 G2513: (year, country, state, city).

Computation of the other levels of the product dimension is performed similarly, as is the computation of the geography dimension.

Aggregate functions can be distributive, algebraic, or holistic. Distributive functions can be computed from results of computations on disjoint subsets of a data set S, such that each element of S is in some subset of S. Algebraic functions can be expressed in terms of other algebraic or distributive functions. Holistic functions (for example, DISTINCT aggregates, inverse distribution functions (e.g., percentile_cont, percentile disc), dense_rank, and first/last aggregates) are not algebraic, therefore they cannot be computed from computations on subsets. For example, SUM DISTINCT computes the sum of all the distinct numbers in a set. Since a set of distinct numbers across the whole set is desired, clearly the set cannot be split into subsets and still produce the correct result.

According to one embodiment, the nested rollup technique for evaluating hierarchical cubes is not followed if the query includes holistic aggregates. Advantages offered through the use of the nested rollup technique rely on the fact that each stage of computation can aggregate a group into a single row, when dealing with algebraic aggregates. With holistic aggregates, rollups other than the first one cannot aggregate data correctly as they require original base data records whereas the first rollup would (reduce or compress) aggregate base data records to aggregated (based on first rollup) records. Consequently, using the nested rollup approach, for each holistic aggregate, base data records need to be preserved across all rollup levels, and doing so is computationally costly.

FIG. 1 is a flowchart illustrating a method for evaluating a query with a concatenation of rollup operators (a hierarchical cube), according to an embodiment of the invention. The query presented above will be used for illustrative purposes in describing FIG. 1, and all exemplary references are to the same query.

In one embodiment, for one of the rollup operators included in the query, data records retrieved from a base table (or a plurality of base tables) are sorted on each grouping field key of each rollup operator. The order in which data is sorted based on multiple rollup operators depends on a query execution plan that is determined by an optimizer or similar program. According to one embodiment and as described in reference to FIG. 6, cardinalities that are determined for each rollup operator are used to determine the order of evaluation, or computation, of rollup operators. For example, if the query execution plan specifies processing the rollup operators in the order of (1) time, (2) product, (3) geography, records are returned from the first rollup operator that are sorted by grouping field keys in the following order: division, family, class, product, country, state, city, year, quarter, day.

At step 102, a rollup result is generated based on the sorted records and according to a rollup operator. In the example, since the query execution plan specifies processing the rollup on the time dimension table (or base table) first, the following groupings are generated:
 G11: (division, family, class, product, country, state, city, year, quarter, day);
 G12: (division, family, class, product, country, state, city, year, quarter);
 G13: (division, family, class, product, country, state, city, year); and
 G14: (division, family, class, product, country, state, city).

Since the embodiment being described is directed to evaluating a database query that includes two or more rollup operators, after the results for a first rollup operator are computed (i.e., a rollup result is generated as at step 102), the results for the other rollup operators are then computed. At step 104, a present (or next) rollup result grouped at each level of a present (or next) rollup operator is generated from the previous rollup result. For example, from the records generated at step 102, that represent the groupings G11–G14 for the time dimension, the product dimension rollup operator is generated. In this example, the product dimension is rolled up next, according to the query execution plan presented above. At decision block 106, it is determined whether there is another rollup operator from the query to compute. If so, then the method returns to step 104 to generate from the previous rollup result a present (or next) rollup result grouped at each level of the present rollup operator. For example, the rollup operator of the geography dimension is next computed, on the results from the product rollup operator, to generate associated results. Step 104 and decision block 106 are repeated until all of the concatenated rollup operators in the query are computed (in combination with the other rollup operators associated with other dimensions) and results generated therefrom. Hence, evaluating database queries that include hierarchical cubes by nesting rollup operators, according to the method illustrated in FIG. 1, offers computational advantages by avoiding the use of temporary tables and avoiding grouping set transformations. Grouping set transformations and use of temporary tables are computationally expensive operations as compared to ordering the rollup operators and would reduce a hierarchical cube query to a UNION of rollups on intermediate results materialized in temporary tables, wherein the extensive read/write operations into these temporary tables can be a significant cost. Refer to U.S. patent application Ser. No. 10/084,597, entitled "Evaluation of Grouping Sets by Reduction to Group-By Clause, With or Without a Rollup Operator, Using Temporary Tables" for related techniques. Additional advantages of this approach include requiring only a single scan of the base data to compute the hierarchical cube; ease of use or specification; scalability; and efficient parallelization, whereby any rollup operator can be evaluated by a set of independent processes working on data partitioned appropriately (described in more detail under the heading "Parallel Evaluation with Partitioning Keys").

Using Cardinalities to Optimize Evaluation of a Hierarchical Cube

The term cardinality refers to the number of cardinal, or basic, items in a set. In a table, such as a database table, the number of rows is used to define the cardinality of the table. To assist in efficiently evaluating database queries that include hierarchical cubes, a concept of rollup cardinality is used to indicate to an optimizer program, prior to the evaluation process, the number of rows generated by each rollup in the hierarchical cube and thus, the number of rows that are considered during the query evaluation process. The goal is to reduce sort costs while evaluating a hierarchical cube, which is accomplished by evaluating a rollup operator that produces a smaller number of rows before evaluating rollup operators that produce a larger number of rows.

Consider the following concatenated rollup:

ROLLUP(a11, a12, . . . a1n$_1$), ROLLUP(a21, a22, . . . a2n$_2$), . . . , ROLLUP(am1, am2, . . . amn$_m$), which is a concatenation of m rollups and would require m nested sorts, in which the i$^{th}$ sort (or rollup) increases the number of rows by 1+card(ai1)+card(ai2)+ . . . card(ain$_i$). It is assumed that a rollup operator is computed such that column aij is dependent on the column ai(j+1). Hence, one extra row would be generated for every distinct value in every column ail to ain$_i$.

If $f_i$=1+card(ai1)+card(ai2)+card(ain$_i$), where $f_i$ is a factor of expansion in the number of rows produced by the ith rollup; and N=cardinality of rows input to the first rollup; and
N$_{GBY}$=cardinality of rows for GROUP BY a11, a12, . . . a1n$_1$, a21, a22, . . . a2n$_2$, . . . am1, am2, . . . amn$_m$;
then, the total cost of computing concatenated rollups consisting of m rollups =C; +C$_2$+ . . . +C$_m$, where

| | | |
|---|---|---|
| Ci | = | cost of computing i$^{th}$ rollup; |
| | = | (cost of computing base GROUP BY of i$^{th}$ rollup by sorting) + (cost of computing returned rows in the i$^{th}$ rollup); |
| | = | Ninput$_i$ log (Nbase$_i$), + f$_i$ Nbase$_i$; |
| where | | |
| Ninput$_i$ | = | Number of rows input to i$^{th}$ rollup; |
| | = | f$_{i-1}$ Ninput$_{i-1}$; |
| | = | f$_{i-1}$ f$_{i-2}$ . . . Ninput$_{i-2}$; |
| | = | f$_{i-1}$ f$_{i-2}$ . . . f$_2$ Ninput$_2$; |
| Ninput$_2$ | = | Number of rows from output of 1$^{st}$ rollup; |
| | = | f$_1$ N$_{GBY}$. |
| Hence, | | |
| Ninput$_i$ | = | f$_1$f$_2$ . . . f$_{i-1}$ N$_{GBY}$ ∀ i≠1; |
| Ninput$_1$ | = | Number of rows input to 1$^{st}$ rollup; |

-continued

| | | |
|---|---|---|
| | = | N. |
| Nbase$_i$ | = | Number of rows in output of (i−1)$^{th}$ rollup ∀ i≠1; |
| | = | Number of rows input to i$^{th}$ rollup ∀ i≠1; |
| | = | Ninput$_i$, ∀ i≠1; |
| | = | f$_1$f$_2$ . . . f$_{i-1}$ N$_{GBY}$ ∀ i≠1. |
| Nbase$_1$ | = | Size of GROUP BY(a11, a12, . . . , a1n$_1$, a21, a22, . . . , a2n$_2$, . . . am1, am2, . . . amn$_m$) |
| | = | N$_{GBY}$. |

Hence,
C$_1$ = N log (N$_{GBY}$) + f$_1$ N$_{GBY}$;
C$_2$ = f$_1$ N$_{GBY}$ log (f$_1$ N$_{GBY}$) + f$_1$f$_2$ N$_{GBY}$;
.
.
.
C$_m$ = f$_1$f$_2$ . . . f$_{m-1}$ N$_{GBY}$ log (f$_1$f$_2$ . . . f$_{m-1}$ N$_{GBY}$) + f$_1$f$_2$ . . . f$_m$ N$_{GBY}$ Therefore, the total cost of a concatenated rollup is
=[N log (N$_{GBY}$)+f$_1$ N$_{GBY}$log (f$_1$ N$_{GBY}$)+ . . . +f$_1$f$_2$ . . . f$_{m-1}$, N$_{GBY}$log (f$_1$f$_2$ . . . f$_{m-1}$ N$_{GBY}$)]+[(f$_1$+f$_1$f$_2$+ . . . +f$_1$f$_2$ . . . f$_m$) N$_{GBY}$. Appreciate that this equation would be minimized if f1<f2< . . . fm.

In one embodiment, the number of keys in each rollup operator and the number of possible values for each column in the rollup specification are used to estimate the number of rows that would be generated in computing a particular rollup operator. The estimated factor by which the number of rows generated by a rollup operator is increased, is a cardinality for that particular rollup operator. Furthermore, a query processing schedule (or order of evaluation) is determined based on the cardinalities for each of the rollup operators, whereby the rollup operator with the lowest cardinality is computed first and subsequent rollup operators are computed in order according to increasing cardinality values. Consequently, the size of sorts are minimized as well as the total sort cost.

To estimate the size of a rollup result, a hierarchy and functional dependency on rollup keys is assumed, and their cardinalities are summed. For example, given ROLLUP(a1, a2, . . . , ai), an estimate of its size, that is, its cardinality, is 1+card(a1)+card(a2)+ . . . +card(ai). The functional dependencies that are assumed are that ai determines ai-1, ai-1 determines ai-2, and so on, to a2 determines a1. That is, for a given value of ai, its parent in the hierarchy can be determined. Furthermore, the "1" is added to the above equation to account for the rollup result row corresponding to the grand total grouping, that is, the ( ) grouping.

Considering the exemplary query presented above, which includes rollups along three dimensions (time, product, and geography), the following example illustrates the computation and use of cardinalities in accordance with an embodiment of the invention. Cardinalities for each key of each rollup are estimated and shown below in parentheses following the key.

R_time: year(1), quarter(4), day(260);
R_prod: division(1), family(10), class(100), product (2000);
R_geog: country(20), state(200), city(500).

Further,
Sizeof(R_time)=1+1+4+260=266;
Sizeof(R_prod)=1+1+10+100+2000=2112;
Sizeof(R_geog)=1+20+200+500=721.

Thus, the total number of output rows=266*2112*721=405,052,032.

Consider two possible query evaluation plans, with the following rollup orders:

P1: R_time, R_geog, R_prod;
P2: R_prod, R_geog, R_time.

For P1:
 R_time input=base; output=2000*500*266=266,000,000;
 R_geog input=266,000,000; output=2000*721*266=383,572,000;
 R_prod input=383,572,000; output=2112*721*266=405,052,032.

For P2:
 R_prod input=base; output 2112*500*260=274,560,000;
 R_geog input=274,560,000; output=2112*721*260=395,915,520;
 R_time input=395,915,520; output=2112*721*266=405,052,032.

Using the equation, total cost of concatenated rollup=[N log ($N_{GBY}$)+$f_1$ $N_{GBY}$ log ($f_1$ $N_{GBY}$)+ . . . +$f_1 f_2$ . . . $f_{m-1}$ $N_{GBY}$ log ($f_1 f_2$ . . . $f_{m-1}$ $N_{GBY}$)]+[(f1+$f_1 f_2$++$f_1 f_2$ . . . $f_m$) $N_{GBY}$, it can be shown that the sort cost for P2 is greater than that for P1 and thus, a query optimization program or algorithm that employs the cardinalities exemplified above would chose the evaluation plan represented as P1.

Figure 2:
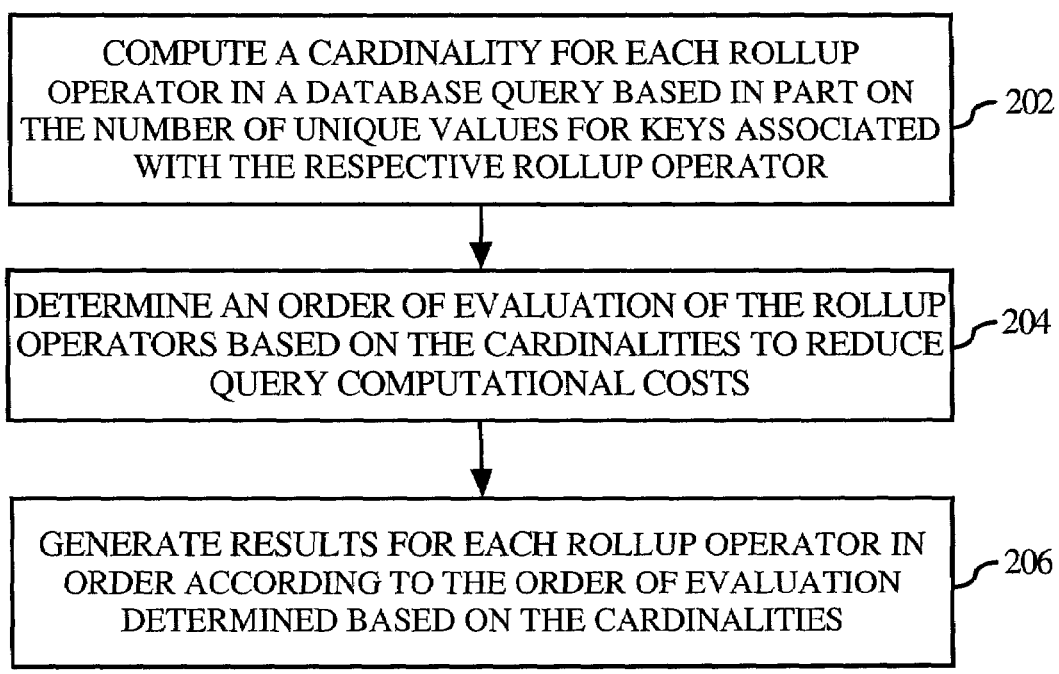
FIG. 2 is a flowchart illustrating a method for evaluating a query with a concatenation of rollup operators, employing the computation and use of cardinalities for estimating the number of records generated by each rollup operator.

FIG. 2 is a flowchart illustrating a method for evaluating a query with a concatenation of rollup operators, according to an embodiment of the invention. The embodiment depicted in FIG. 2 is illustrative of the computation and use of cardinalities for estimating the number of records generated by each rollup operator, as described above. The method depicted as an embodiment in FIG. 2 can be utilized in combination with the method depicted as an embodiment in FIG. 1 to efficiently evaluate a query that includes hierarchical cubes, or can be utilized independently for other applications.

In describing this method, attention is directed to the description above for an example of the steps depicted in FIG. 2. At step 202, a cardinality is computed for each rollup operator. In one embodiment, the cardinalities are based in part on the number of grouping field keys associated with the respective rollup operators. At step 204, an order of evaluation of the rollup operators is determined based on the cardinalities, in order to reduce or minimize computation costs. At step 206, results are generated for each rollup operator in an order according to the determination made at step 204, which was based on the cardinalities computed at step 202.

Grouping Identifier

In furtherance of the computation of a hierarchical cube, groupings at each level of each rollup operator are distinguished. In one embodiment, computing and propagating a single number that distinguishes groupings at each stage of computation, is used. This distinguishing number is referred to, generally, as a grouping distinguisher (gid; herein also referred to as a grouping identifier). Thus, at each stage of computation (which represents each rollup operator of a hierarchical cube), a grouping distinguisher is computed to uniquely identify groupings resulting from each stage of the hierarchical cube evaluation. In addition, according to one embodiment, the gid field generated at one stage of the query evaluation is included in the grouping keys of the next stage, at least for sorting purposes. In reference to the exemplary query, eighty (80) total groupings would be identified through use of unique grouping distinguishers. That is, four levels of the geography dimension (including the "all" grouping) rolled up on each of five levels of the product dimension (including the "all" grouping) rolled up on each of four levels of the time dimension (including the "all" grouping).

According to one embodiment, a grouping_id (grouping identifier) function returns a number that uniquely identifies the different groupings of an aggregate result set. In one embodiment, the grouping_id function returns a number corresponding to a bit-vector associated with a grouping level of a row. Essentially, the grouping_id function is equivalent to forming a bit vector from the results of grouping functions on grouping field keys where the grouping function returns a "0" if data is aggregated on a particular grouping field key or a "1" if not. Therefore, the bit-vector is treated as a binary number, and the number's base-10 value is returned by the grouping_id function.

In the nested rollup embodiment, the grouping_id function only distinguishes levels from the rollup operator at any one stage. Therefore, one embodiment utilizes a global grouping identifier that distinguishes groupings resulting from the application of rollup operators of the hierarchical cube. In one embodiment, the global identifier is obtained by fixing the order of keys inside the grouping_id function specification throughout the multiple rollup operators of the hierarchical cube, and combining (or adding) grouping identifiers of a particular stage with the grouping identifier of groups produced by the preceding rollup. Thus, a single field in the result table at each stage will serve as the grouping distinguisher, thereby minimizing computational costs associated with sorting the tables, because as the number of columns/keys on which sorting is performed decreases, the overhead and comparison costs also decrease.

For example, in the evaluation of the query presented above, a first stage grouping operation is performed on the base data, as follows:
 GROUP BY division, family, class, product, country, state, city, rollup(year, quarter, day).

In addition, at the first stage of query evaluation, the grouping distinguisher for the rollup R_I (i.e., rollup (year, quarter, day)), gid_I, is computed by the following function:
 gid_=grouping_id (country, state, city, division, family, class, product, year, quarter, day).

FIG. 3 is a table illustrating the computation of grouping distinguisher, gid_I, as presented above. For the rollup (year, quarter, day) operator (R_I), and for subsequent rollup operators (R_J being rollup (division, family, class, product) and R_K being rollup (country, state, city)), the "DAY" column represents the first bit field, with a base-10 value of "1"; the "QUARTER" column represents the second bit field, with a base-10 value of "2"; the "YEAR" column represents the third bit field, with a base-10 value of "4", and so on to the "COUNTRY" column, which represents the tenth bit field, with a base-10 value of "512." Furthermore, table 302 illustrates the computation of gid_I, according to the function above, which is associated with the first stage of the GROUP BY clause, as shown above. Group G11 refers to the grouping (division, family, class, product, country, state, city, year, quarter, day) generated by the rollup (year, quarter, day) operation; G12 refers to the grouping (division, family, class, product, country, state, city, year, quarter), and so on, as described above.

Since G11 is a grouping that includes fields for all keys of all rollup operators, each bit field contains a "0" and hence, the associated gid_I for that grouping G11 is "0", as shown in table 302. Grouping G12 does not include the "DAY" field, thus a "1" appears in that bit field, and the gid_I for G12 is "1." Grouping G13 does not include the "DAY" or the "QUARTER" fields, thus gid_I for G13 is "3." Similarly, gid_I for G14 is "7" based on the bit vector represented in table 302.

Continuing with evaluation of the query presented above, according to embodiments of the invention, a second stage grouping operation is performed on the data generated from the first stage, that is from the rollup of (year, quarter, day). At stage 2, the following are computed:

GROUP BY year, quarter, day, country, state, city, gid_I, rollup(division, family, class, product); and gid_J=gid_I+grouping_id (country, state, city, division, family, class, product, year, quarter, day).

Note the presence of the grouping distinguisher, gid_I, as a second stage GROUP BY key. Also note that the grouping field keys in the grouping distinguisher function are in a fixed order at each stage of computation.

One benefit of using grouping distinguishers is to differentiate aggregate levels. More specifically, grouping distinguishers differentiate between null values for fields of records produced by a rollup operator (as in sub-total records) and null values in the dataset. Therefore, if non-null constraints are enforced on rollup columns, that is, if the dataset cannot have nulls, then grouping distinguishers are not required. Hence, in one embodiment, during or prior to evaluation of a query the datasets are evaluated to determine whether any non-null constraints are present. If non-null constraints are found on all rollup keys, then grouping distinguishers are not computed, consequently saving computational resources due to one less function to execute and due to smaller sorts due to one fewer key (i.e., no gid key).

Method for Distinguishing Grouping Levels

Figure 4:
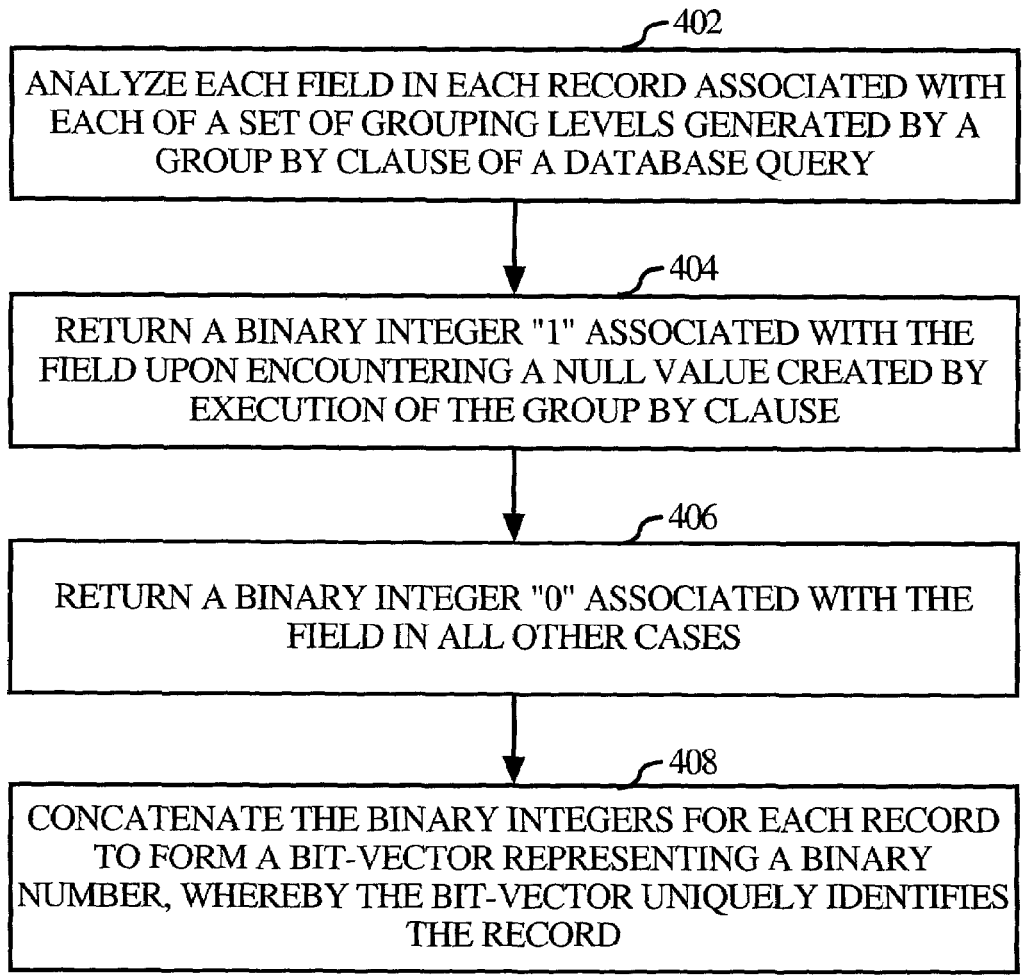
FIG. 4 is a flowchart illustrating a method for distinguishing a grouping level from another grouping level in a set of grouping levels generated by a GROUP BY clause of a database query.

FIG. 4 is a flowchart illustrating a method for distinguishing a grouping level from another grouping level in a set of grouping levels generated by a GROUP BY clause of a database query, according to an embodiment of the invention. Refer also to FIGS. 3A and 3B for an example of the following method. At step 402, for each record associated with each of the set of grouping level results from the GROUP BY clause, each data field is analyzed. For example, for the GROUP BY rollup(year, quarter, day), the year, quarter, and day fields for each record generated in the computation of the rollup operator are analyzed. At step 404, any of the fields that have a null value that was created by execution of the GROUP BY clause are assigned, or returned with, a binary integer "1." The nature of the rollup operator is such that records are returned that essentially represent sub-totals at the various levels of grouping dictated by the grouping field keys of the rollup operator. Therefore, the fields of the rollup results that are "null" due to the nature of the function, that is, the field or fields that are not included in any particular level of rollup, are assigned a "1." At step 406, fields that have non-null values or null values not generated/created by the execution of the GROUP BY clause are returned with a binary integer "0" value. At step 408, the binary integers determined at steps 404 and 406 are concatenated to form a bit-vector which represents a binary number, whereby the bit-vector uniquely identifies the record. Furthermore, according to one embodiment, the base-10 value representing the bit-vector for a record is used to uniquely identify the record.

Evaluating a Hierarchical Cube Using Grouping Identifiers

Figure 5:
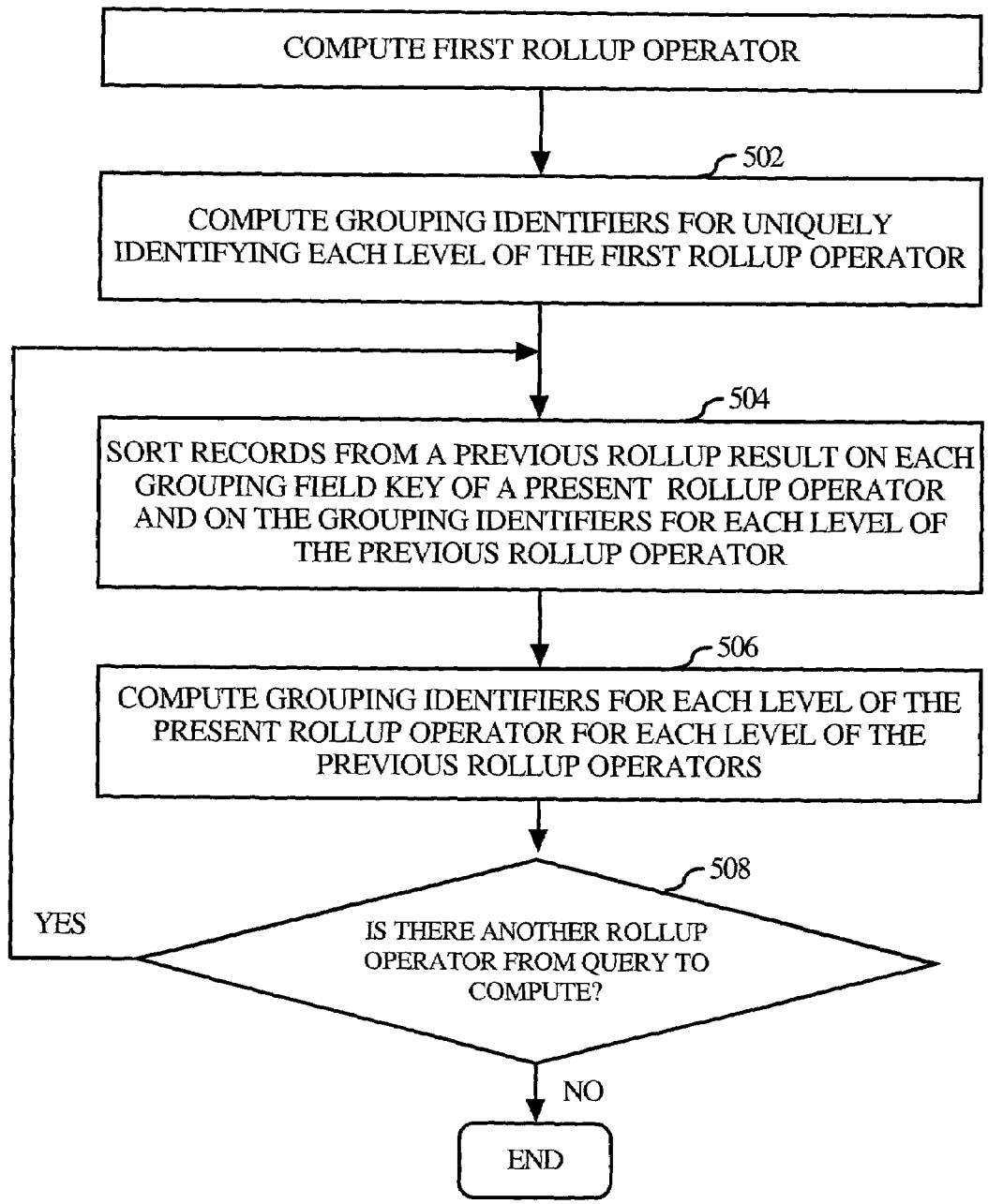
FIG. 5 is a flowchart illustrating a method for evaluating a query with a concatenation of rollup operators, employing the computation and use of grouping distinguishers.

FIG. 5 is a flowchart illustrating a method for evaluating a query with a concatenation of rollup operators, according to an embodiment of the invention. The embodiment depicted in FIG. 5 is illustrative of the computation and use of grouping identifiers, as described above in reference to FIGS. 3A and 3B. The method depicted as an embodiment in FIG. 5 can be utilized in combination with the method depicted as an embodiment in FIG. 1 to efficiently evaluate a query that includes hierarchical cubes, or can be utilized independently for other applications.

At step 502, grouping identifiers are computed for uniquely identifying each level of a first rollup operator of a hierarchical cube. Following the preceding example, rollup of the time dimension occurs first, thus, grouping identifiers for the groupings generated by computing the rollup of the time dimension occurs at this step. Reference to FIG. 3A and the associated description shows that the grouping identifiers for a first stage rollup of the time dimension are as follows:

gid_G11=0;
gid_G12=1;
gid_G13=3;
gid_G14=7.

According to one embodiment, grouping_id(country, state, city, division, family, class, product, year, quarter, day) returns the preceding base-ten values based on bit vectors that distinguish each grouping level of the time dimension rollup.

According to one embodiment, at optional step 504, records from a previous rollup are sorted on each grouping field key of a present rollup operator and on the grouping identifiers for each level of the previous rollup operator. For example, the results from the rollup of the time dimension are sorted on the grouping field keys of the product dimension and on the grouping identifiers of the time dimension groupings.

At step 506, grouping identifiers are computed for each level of the present rollup operator for each level of the previous rollup operator. For example, each level of the product rollup operator for each level of the time rollup operator are distinguished from other rollup levels by the grouping identifiers. Hence, as described above and illustrated in FIG. 3B, grouping identifiers for G2111 through G2514 are computed, generally according to the function gid_J gid_I+gid_j, where gid_j represents temporary grouping identifiers for the present rollup groupings and gid_I represents the grouping identifiers for the previous rollup groupings. In the example, gid_j=grouping_id(country, state, city, division, family, class, product, year, quarter, day), which computes the temporary grouping identifiers for the product rollup grouping levels. Since the product rollup is not the first rollup computed, to properly distinguish each level of the product rollup at each level of the time rollup (i.e., groupings G2111 through G2514), in one embodiment, the base-10 value associated with each level of the time rollup are summed with the base-10 values associated with each level of the product rollup represented as the temporary grouping identifiers, gid_j. Note from the example and FIG. 3B that, according to one embodiment; the order of the keys inside the grouping_id specification is fixed, such that with a single column serving as grouping distinguisher, sorting overhead is small and constant. Thus, global identifiers can be computed that distinguish each level of each rollup operator across each level of the other rollup operators according to the concatenation of operators as identified in the query. The process of computing grouping identifiers for each successive rollup operator is continued until all levels are distinguished.

At decision block 508, it is determined whether there is another rollup operator from the query to compute. If there is another rollup to compute, then the process returns to step 504 to sort records from the previous rollup result, whereby sorting is performed on the grouping field keys of the present rollup operator and on the grouping identifiers for each level of the previous rollup operator. In the example, the result records from the rollup of the product dimension are sorted on the grouping keys of the geography dimension (i.e., country, city, state) and on the grouping identifiers computed for the product dimension (i.e., the values in the gid_J field of FIG. 3B). Then at step 506, grouping identifiers are computed for each level of the geography rollup for each level of the product rollup for each level of the time rollup. As described above, through practice of this embodiment, one hundred fifty (150) total groupings would be identified through use of unique grouping distinguishers for the exemplary query. If a query includes more concatenated rollup operators, then steps 504–508 are repeated until grouping identifiers are computed for distinguishing every level of every rollup.

Handling Algebraic Aggregates

A distributive aggregate function is a function f such that:

$$f(s)=f(f(s_1),f(s_2),\ldots f(s_n)),$$

where $s=s_1 \cup s_2 \ldots \cup s_n$, and $s_i \cap s_j = 0 \; \forall i \neq j$ and $1 \leq i,j \leq n$. Hence, a distributive aggregate function on a set S can be computed by applying it to the set of results from computation of this function on component subsets. Distributive functions in the SQL language, such as SUM, MAX, and MIN, are relatively straightforward to compute by nesting rollups, as described above, for evaluating queries that include concatenation of rollup operators, i.e., hierarchical cubes. This is because aggregates computed at one stage can be aggregated again at another stage to produce the desired results. However, computation of algebraic aggregates that are not distributive in nature, such as AVG, VAR, and STDDEV, is not as straightforward because the algebraic aggregates computed at one stage cannot easily be aggregated at another stage. For example, AVG(1, 2, 4, 10) is not equal to AVG(AVG(1, 2, 4), AVG(10)), and COUNT(1, 2, 4, 10) is not equal to COUNT(COUNT(1, 2), COUNT(4, 10)). Thus, one embodiment solves this issue by representing algebraic aggregates in terms of distributive aggregate functions. For example, COUNT(1, 2, 4, 10)=SUM(COUNT(1, 2), COUNT(4, 10)), and AVG(1, 2, 4, 10)=SUM(1, 2, 4, 10)/COUNT(1, 2, 4, 10). Therefore, utilizing the nested rollup technique, if SUM and COUNT are computed at each stage of the query evaluation and propagated to the next stage, AVG can be computed in the final stage.

Figure 6:
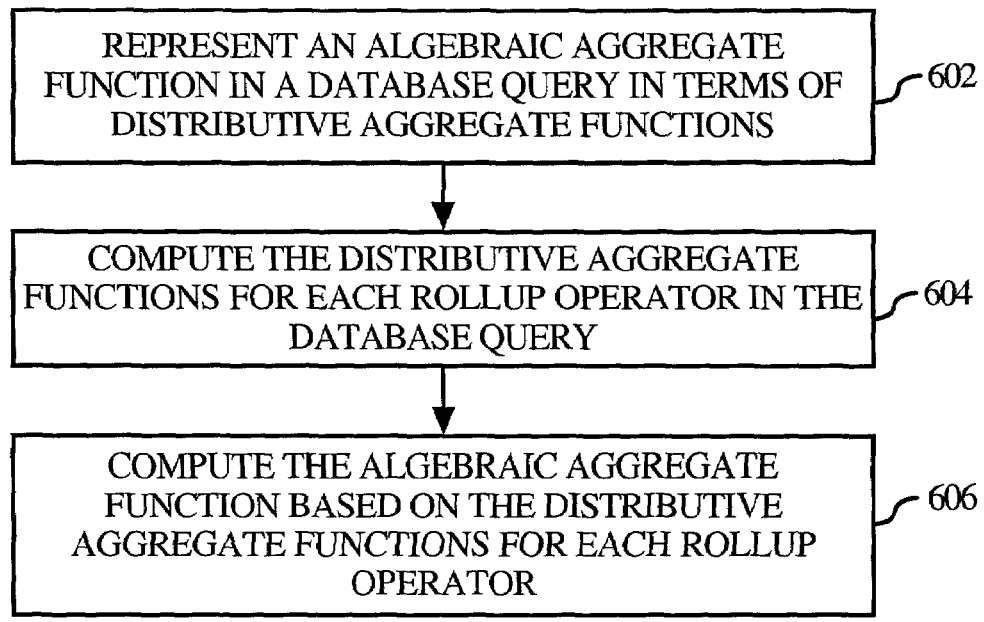
FIG. 6 is a flowchart illustrating a method for evaluating a database query that includes a concatenation of rollup operators and an algebraic aggregate function.

FIG. 6 is a flowchart illustrating a method for evaluating a database query that includes a concatenation of rollup operators and an algebraic aggregate function, according to an embodiment of the invention. At step 602, the algebraic aggregate function is represented in terms of multiple distributive aggregate functions. For example, the algebraic function AVG can be represented in terms of the distributive functions SUM and COUNT, that is, AVG(x)=SUM(x)/COUNT(x). So the avg(profits) function in the exemplary query can be represented as sum(profits)/count(profits). At step 604, the distributive aggregate functions for each rollup operator are computed. For example, when computing each level of the rollup operator on the time dimension, the sum of the values in the profits field for each record in the join of fact and time tables and the count (or number) of records in the join of fact and time tables are computed. The same distributive functions are computed for the remainder of the rollup operators constituent to the query. For example, when computing the product rollup operator, the distributive function results from each level of the time rollup are propagated to the product rollup operator and summed with the distributive function results from each level of the product rollup. Computation and propagation of the distributive aggregate functions that are used to represent the algebraic aggregate function from one rollup to a successive rollup continues until reaching the final rollup operator. At that point, at step 606, the algebraic function is computed based on the distributive function results, which have been summed and propagated up the chain of rollup operator computations. For example, when computing the geography rollup, the sum of sum(profits) that have propagated through the time and product rollups are finally divided by the sum of count(profits) that have propagated through the time and product rollup to compute the original algebraic aggregate function according the hierarchical cube of the database query.

In other words, the aggregate computation corresponding to avg(profits) at each stage of the query evaluation (i.e., at the computation of each rollup operator in the query) is as follows.

rollup(time): computes sum_x sum(x); count_x count(x);
rollup(product): computes sum_x=sum(sum_x); count_x=; sum(count_x);
rollup(geography): computes sum_x=sum(sum_x); count_x=sum(count_x); and avg_x=sum_x/count_x, if count_x≠0; avg_x=null, otherwise. The same method can be used for VAR and STDDEV by expanding into distributive functions such as SUM and COUNT.

Parallel Evaluation with Partitioning Keys

According to one embodiment, a two-stage (producer-consumer) execution model is utilized in processing a query containing concatenation of rollup operators. The execution implementation may actually have more than two stages, but the two stages referred to describe the relationship in which the output from one stage (producer) is the input to the next stage (consumer) and in which only two stages are active at any point in time. In this model, a set of processes (sometimes called slaves) are assigned to perform computations with respect to each stage, thus, at any point in time, one set of slaves is the producer, producing the data, and one set of slaves is the consumer, awaiting data from the producer. Slaves at each stage work independently of other slaves working at the same stage, and each slave is assigned a particular portion of a table or particular records with which to work. Once the first stage producer slaves are finished with processing, they become third stage consumer slaves awaiting data from the second stage slaves. This process continues until all stages of the query computation are completed. To implement this parallel mode of execution for a query, a query execution plan is divided into different stages. Each stage is referred to as a data flow operation (DFO).

The evaluation scheme for hierarchical cubes, described above as an embodiment of the invention, is scalable in that each rollup computation can be delegated to a set of processing slaves, which compute their associated rollup independently of other processing slaves. To that end, in one embodiment, data is partitioned among slaves such that each slave assigned to a particular rollup operator can complete its processing tasks independently of other slaves. Partitioning, which is a mechanism that can be used for sending particular rows of data from one processing stage to the next processing stage, is implemented for computational efficiency purposes. Essentially, the processing slaves are sent the data records that are needed to compute their portion of the assigned rollup.

In one embodiment, data records are partitioned on non-rollup keys before being passed from one processing stage to the next processing stage. For example, one set of processing slaves can be assigned to scan the base table (stage 1) and send the results to the next set of slaves that are assigned the processing related to the rollup R_I (stage 2). In passing the data records from stage 1 to stage 2, the records are partitioned on non-rollup keys, that is, (J__1, . . . , J_j, K__1, . . . , K_k, L__1, . . . , L__1). Similarly, slaves processing R_I send their result data records to the next set of slaves that are assigned the processing related to R_J, whereby the records are partitioned on (I__1, . . . , I₁, K__1, . . . K_k, L__1, . . . , L__1). In one embodiment, the partitioning occurring between stages is a hash partitioning. Other embodiments utilize range partitioning or round-robin partitioning. The type of partitioning to use is typically determined during the generation of a query execution plan. In another embodiment, rows can additionally be partitioned on the grouping identifier. Hence, in passing records from stage 1 to stage 2, records are partitioned into (I__1, I__1, K__1, . . . K_k, L__1, . . . , L__1, GID_I).

Figure 7:
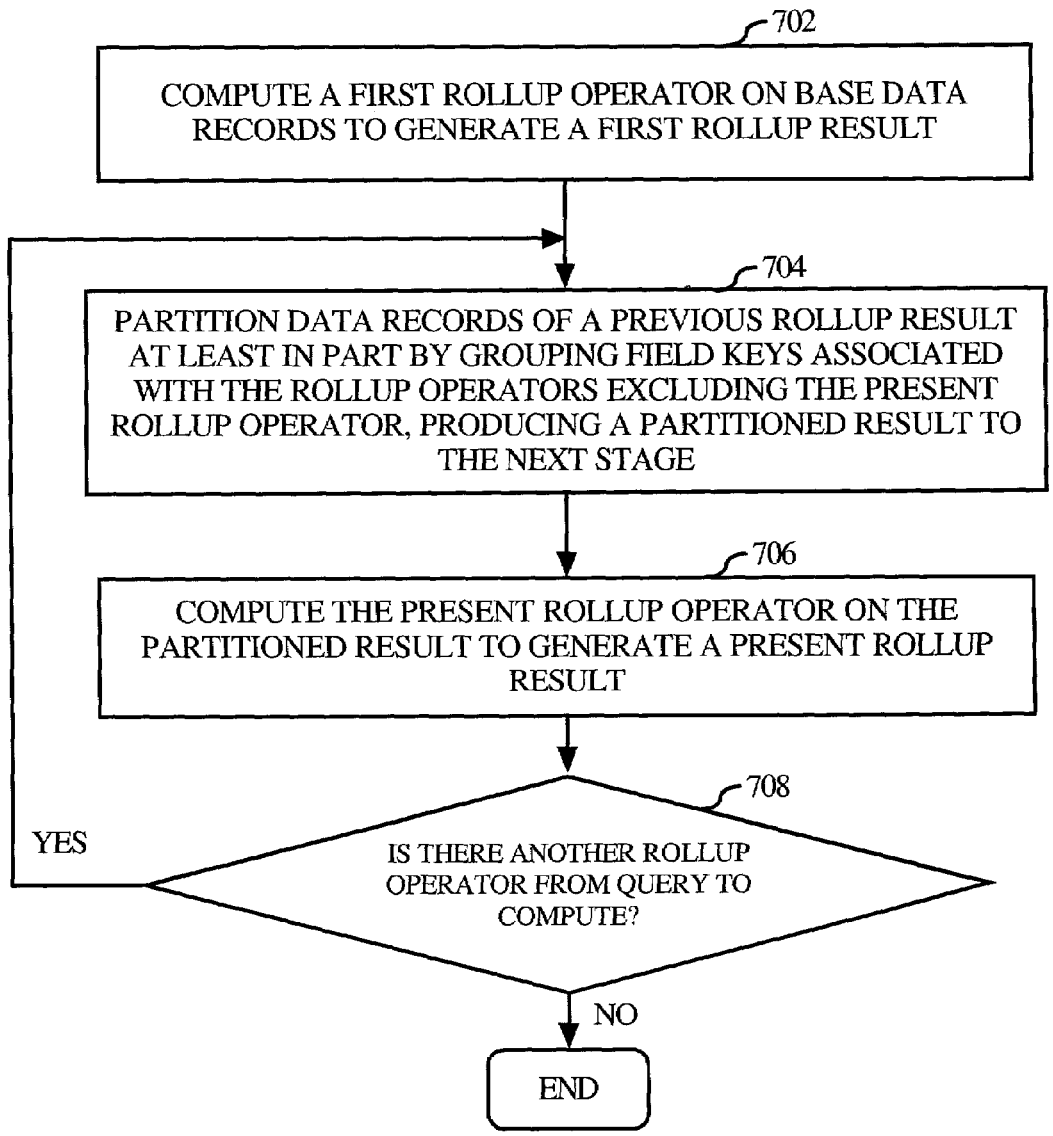
FIG. 7 is a flowchart illustrating a method for evaluating a database query that includes multiple rollup operators.

FIG. 7 is a flowchart illustrating a method for evaluating a database query that includes multiple rollup operators. According to one embodiment, this method is used in evaluating a query that includes a concatenation of rollup operators, i.e., a hierarchical cube. According to one embodiment, this method is used as part of a parallel evaluation scheme, where computation of each rollup operator is delegated to a set of two or more processing slaves that compute their respective rollup operator independently of other processing slaves that compute their respective rollup operator. First, one of the multiple rollup operators is computed from the base data records, at step 702. For example, rollup(year, quarter, day) is computed to generate the associated four groupings, as described above. If using a parallel evaluation scheme, the slaves that scan the base table then partition the records on non-rollup keys prior to sending to the slaves that compute the rollup of the time dimension.

After computation of the first rollup operator, for each of the other rollup operators of the query (i.e., for each successive query execution stage, or data flow operation), the data records from the previous rollup result are partitioned on grouping field keys from each of the other rollup operators other than the function presently being computed, at step 704. For example, in transitioning from the computation of the rollup of the time dimension to the rollup of the product dimension, the result records from the time rollup are partitioned on (year, quarter, day, country, state, city) prior to passing to the processing slaves that are assigned the processing of the product rollup. At step 706, the present rollup operator is computed based on the partitioned result records from the previous rollup operator. At decision block 708, it is determined whether there is an additional rollup operator in the query that need to be computed. If there is, then the process returns to step 704 to partition the results from the previous rollup operator on the non-rollup grouping field keys, and subsequently computes the present rollup operator. Steps 704–708 are repeated until all rollup operators included in the query are computed. Note that in one embodiment, the results from a rollup operator at one stage are partitioned (e.g., at step 704) also on grouping identifiers (described above) prior to passing to the next rollup operator at the next stage.

Hardware Overview

Figure 8:
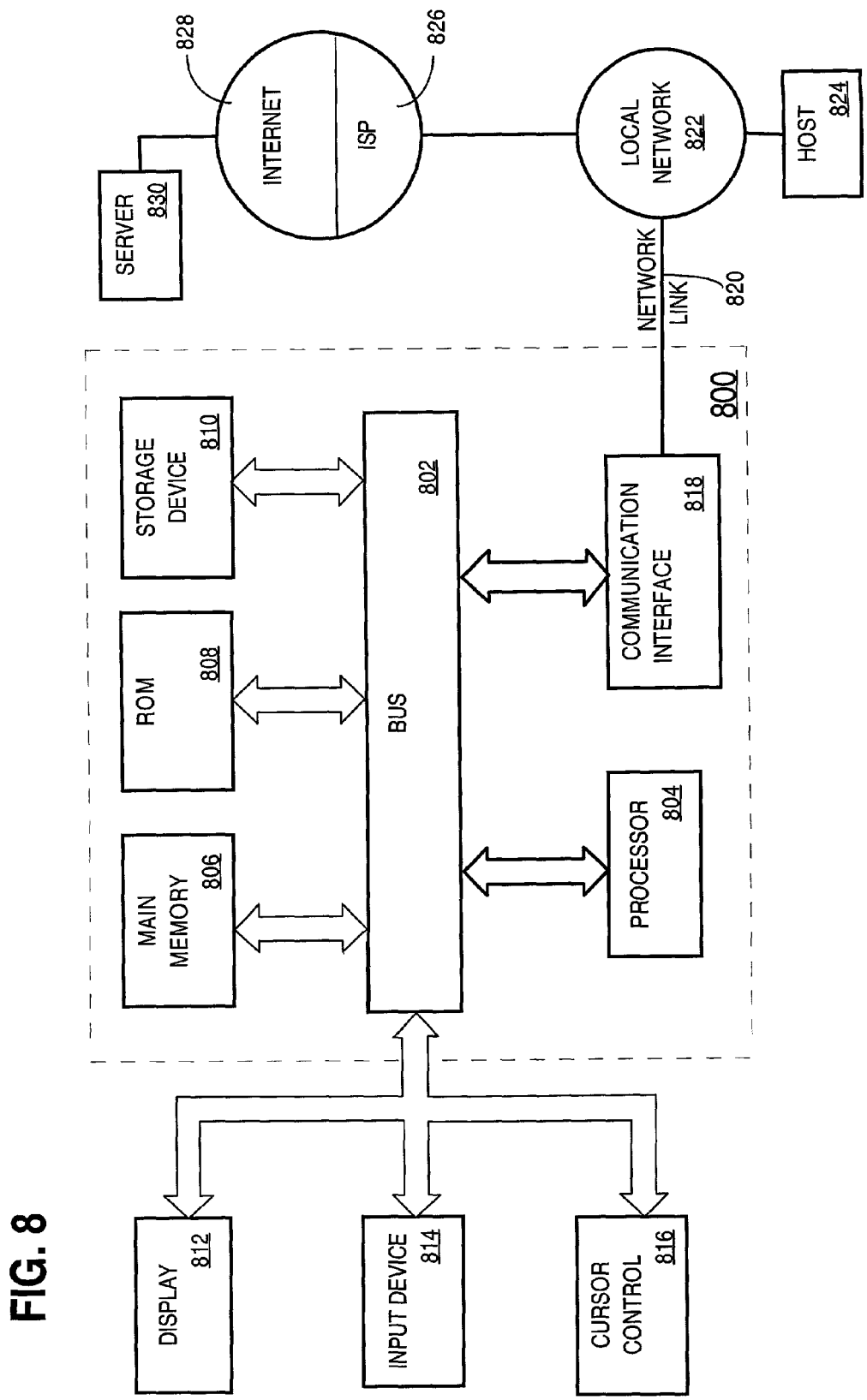
FIG. 8 is a block diagram that illustrates a computer system upon which an embodiment of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk, optical disk, or magneto-optical disk, is provided and coupled to bus 802 for storing information and instructions.

Computer system 800 may be coupled via bus 802 to a display 812, such as a cathode ray tube (CRT) or a liquid crystal display (LCD), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical, magnetic, or magneto-optical disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. For example, references have been made to the SQL database query language and examples of queries using SQL have been utilized throughout to aid in describing the invention. However, the techniques described herein are not limited to any database query language. For another example, the techniques described are based on the use of sort-based algorithms for computing rollup operators and aggregate functions. However, the techniques described herein are not limited to use with sort-based query evaluation algorithms, but may be used in conjunction with algorithms that do not group records by sorting. Furthermore, the various embodiments described herein offer benefits when used in combination with other embodiments described herein, and when used in support of other implementations of database query evaluation processes not described herein. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for evaluating a database query that includes two or more rollup operators, wherein each of the two or more rollup operators is associated with one or more grouping keys, and wherein the two or more rollup operators are concatenated to result in multiple groupings, the method comprising the steps of:

responding to the database query by performing the steps of:

for a first rollup operator of the two or more rollup operators, generating a first rollup result, from base data records, that comprises records that are grouped at least in part at each level of the first rollup operator;

for a second rollup operator of the two or more operators, generating, from the first rollup result, a second rollup result that comprises records that are grouped at least in part at each level of the second rollup operator.

2. The method of claim 1 further comprising the steps of:

for the first rollup operator, computing first grouping identifiers for uniquely identifying each level of the first rollup operator;

for the second rollup operator, computing second grouping identifiers for uniquely identifying each level of the second rollup operator for each level of the first rollup operator.

3. The method of claim 2 wherein the step of computing the second grouping identifiers is computed as the sum of the first grouping identifiers and temporary grouping identifiers associated with each level of the second rollup operator.

4. The method of claim 2 wherein the steps of computing the first and second grouping identifiers are performed such that the grouping identifiers are computed as integers that represent bit vectors, wherein each bit corresponds to a grouping key of a rollup operator.

5. The method of claim 2 wherein arguments of a grouping identifier function used to compute the grouping identifiers are in an order that is fixed for all of the rollup operators, and wherein the steps of computing grouping identifiers are performed based on the grouping identifier function.

6. The method of claim 1 wherein, for the second rollup operator, the step of generating a second rollup result includes,
sorting records from the first rollup result on all of the one or more grouping keys of the second rollup operator and on the grouping identifiers of the first rollup operator.

7. The method of claim 1 wherein the query further comprises an algebraic aggregate function specifying aggregation of data, further comprising the steps of:
representing the algebraic aggregate function in terms of distributive aggregate functions;
computing the distributive aggregate functions for each rollup operator; and
computing the algebraic aggregate function based on the distributive aggregate functions.

8. The method of claim 1 further comprising:
computing a cardinality for each rollup operator based at least in part on the number of unique values for grouping keys included in the respective rollup operator;
determining an order of evaluation of the rollup operators based on the cardinalities to reduce computational cost of sorting;
wherein the steps of generating results for each rollup operator are performed according to the order of evaluation determined based on the cardinalities.

9. The method of claim 8 wherein the cardinalities are based at least in part on an estimation of a number of records generated by evaluation of each rollup operator, and wherein the step of determining an order of evaluation is based on the cardinalities.

10. The method of claim 8 wherein the order of evaluation is determined such that rollup operators with a lower cardinality are evaluated prior to rollup operators with a higher cardinality.

11. A method for evaluating a database query that includes two or more rollup operators, wherein each of the two or more rollup operators is associated with one or more grouping keys, and wherein the two or more rollup operators are concatenated to result in multiple groupings, the method comprising the steps of:
responding to the database query by performing the steps of:
for a first rollup operator of the two or more rollup operators,
executing a rollup operator on base data records to generate a first rollup result;
for a second rollup operator of the two or more rollup operators other than the first rollup operator,
partitioning data records of the first rollup result at least in part based on grouping keys associated with the two or more rollup operators excluding the second rollup operator, producing a partitioned result;
executing the second rollup operator on the partitioned result to generate a second rollup result.

12. The method of claim 11 comprising the step of, for the first rollup operator, partitioning the base data records at least in part based on grouping keys associated with the two or more rollup operators excluding the first rollup operator, prior to computing the first rollup operator.

13. The method of claim 11 further comprising the steps of:
for the first rollup operator,
computing grouping identifiers for uniquely identifying each level of the first rollup operator;
for the second rollup operator,
computing grouping identifiers for uniquely identifying each level of the second rollup operator for each level of the first rollup operator; and
wherein the step of partitioning data records is performed by partitioning data records of the first rollup result at least in part by the grouping identifiers.

14. The method of claim 11 wherein processing of the steps is split into multiple stages, and wherein each stage corresponds to a rollup operator, and wherein each stage is independently processed by a set of processing slaves.

15. A computer-readable storage medium carrying one or more sequences of instructions for evaluating a database query that includes two or more rollup operators, wherein each of the two or more rollup operators is associated with one or more grouping keys, and wherein the two or more rollup operators are concatenated to result in multiple groupings, wherein execution of the one or more sequences of instructions by one or more processors causes the one or more processors to perform the steps of:
responding to the database query by performing the steps of:
for a first rollup operator of the two or more rollup operators,
generating a first rollup result, from base data records, that comprises records that are grouped at least in part at each level of the first rollup operator;
for a second rollup operator of the two or more operators,
generating, from the first rollup result, a second rollup result that comprises records that are grouped at least in part at each level of the second rollup operator.

16. The computer-readable storage medium of claim 15 wherein execution of the one or more sequences of instructions by one or more processors causes the one or more processors to perform the steps of:
for the first rollup operator,
computing first grouping identifiers for uniquely identifying each level of the first rollup operator;
for the second rollup operator,
computing second grouping identifiers for uniquely identifying each level of the second rollup operator for each level of the first rollup operator.

17. The computer-readable storage medium of claim 16 wherein execution of the one or more sequences of instructions by one or more processors causes the one or more processors to perform the step of computing the second grouping identifiers by computing the second grouping identifiers as the sum of the first grouping identifiers and temporary grouping identifiers associated with each level of the second rollup operator.

18. The computer-readable storage medium of claim 16 wherein execution of the one or more sequences of instructions by one or more processors causes the one or more processors to perform the steps of computing the grouping identifiers as integers that represent bit vectors, wherein each bit that is associated with the bit vector corresponds to a grouping key of a rollup operator.

19. The computer-readable storage medium of claim 16 wherein arguments of a grouping identifier function used to compute the grouping identifiers are in an order that is fixed for all of the rollup operators, and wherein execution of the one or more sequences of instructions by one or more processors causes the one or more processors to perform the steps of computing grouping identifiers based on the grouping identifier function.

20. The computer-readable storage medium of claim 16 wherein execution of the one or more sequences of instructions by one or more processors causes the one or more processors to perform the steps of:
for the second rollup operator, prior to computing the second grouping identifiers,
sorting records from the first rollup result on all of the one or more grouping keys of the second rollup operator and on the grouping identifiers of the first rollup operator.

21. The computer-readable storage medium of claim 15 wherein the query further comprises an algebraic aggregate function specifying aggregation of data in a field, and wherein execution of the one or more sequences of instructions by one or more processors causes the one or more processors to perform the steps of:
representing the algebraic aggregate function in terms of distributive aggregate functions;
computing the distributive aggregate functions for each rollup operator; and
computing the algebraic aggregate function based on the distributive aggregate functions for each rollup operator.

22. The computer-readable storage medium of claim 15 wherein execution of the one or more sequences of instructions by one or more processors causes the one or more processors to perform the steps of:
computing a cardinality for each rollup operator based at least in part on the number of unique values for grouping keys included in the respective rollup operator;
determining an order of evaluation of the rollup operators based on the cardinalities to reduce computational cost of sorting;
wherein the steps of generating results for each rollup operator are performed according to the order of evaluation determined based on the cardinalities.

23. The computer-readable storage medium of claim 22 wherein the cardinalities are based at least in part on an estimation of a number of records generated by evaluation of each rollup operator, and wherein execution of the one or more sequences of instructions by one or more processors causes the one or more processors to perform the step of determining an order of evaluation based on the cardinalities.

24. The computer-readable storage medium of claim 22 wherein execution of the one or more sequences of instructions by one or more processors causes the one or more processors to perform the step of determining an order of evaluation such that rollup operators with a lower cardinality are evaluated prior to rollup operators with a higher cardinality.

25. The computer-readable storage medium carrying one or more sequences of instructions for evaluating a database query that includes two or more rollup operators, wherein each of the two or more rollup operators is associated with one or more grouping keys, and wherein the two or more rollup operators are concatenated to result in multiple groupings, wherein execution of the one or more sequences of instructions by one or more processors causes the one or more processors to perform the steps of:
responding to the database query by performing the steps of:
for a first rollup operator of the two or more rollup operators,
executing a rollup operator on base data records to generate a first rollup result;
for a second rollup operator of the two or more rollup operators other than the first rollup operator,
partitioning data records of the first rollup result at least in part by based on grouping keys associated with the two or more rollup operators excluding the second rollup operator, producing a partitioned result;
executing the second rollup operator on the partitioned result to generate a second rollup result.

26. The computer-readable storage medium of claim 25 wherein execution of the one or more sequences of instructions by one or more processors causes the one or more processors to perform the steps of:
for the first rollup operator,
computing grouping identifiers for uniquely identifying each level of the first rollup operator;
for the second rollup operator,
computing grouping identifiers for uniquely identifying each level of the second rollup operator for each level of the first rollup operator; and
wherein the step of partitioning data records is performed by partitioning data records of the first rollup result at least in part by the grouping identifiers.

27. A computer apparatus comprising:
a memory; and
one or more processors coupled to the memory and configured to execute one or more sequence of instructions for evaluating a database query that includes two or more rollup operators, wherein each of the two or more rollup operators is associated with one or more grouping keys, and wherein the two or more rollup operators are concatenated to result in multiple groupings, wherein execution of the one or more sequences of instructions by one or more processors causes the one or more processors to perform the steps of:
responding to the database query by performing the steps of:
for a first rollup operator of the two or more rollup operators,
generating a first rollup result, from base data records, that comprises records that are grouped at least in part at each level of the first rollup operator;
for a second rollup operator of the two or more operators,
generating, from the first rollup result, a second rollup result that comprises records that are grouped at least in part at each level of the second rollup operator.

28. A computer apparatus comprising:
a memory; and
one or more processors coupled to the memory and configured to execute one or more sequence of instructions for evaluating a database query that includes two or more rollup operators, wherein each of the two or more rollup operators is associated with one or more grouping keys, and wherein the two or more rollup operators are concatenated to result in multiple groupings, wherein execution of the one or more sequences of instructions by one or more processors causes the one or more processors to perform the steps of:

responding to the database query by performing the steps of:

for a first rollup operator of the two or more rollup operators,
   executing a rollup operator on base data records to generate a first rollup result;
for a second rollup operator of the two or more rollup operators other than the first rollup operator,
   partitioning data records of the first rollup result at least in part based on grouping keys associated with the two or more rollup operators excluding the second rollup operator, producing a partitioned result;
executing the second rollup operator on the partitioned result to generate a second rollup result.

* * * * *

UNITED STATES PATENT AND TRADEMARK OFFICE
CERTIFICATE OF CORRECTION

| | |
|---|---|
| PATENT NO. | : 7,035,843 B1 |
| APPLICATION NO. | : 10/077828 |
| DATED | : April 25, 2006 |
| INVENTOR(S) | : Srikanth Bellamkonda et al. |

It is certified that error appears in the above-identified patent and that said Letters Patent is hereby corrected as shown below:

Column 23
Claim 25, line 61: Delete "The computer-readable" and insert --A computer-readable--.

Column 24
Claim 25, line 12: Delete "part by based" and insert --part based--.

Signed and Sealed this

Eighth Day of August, 2006

JON W. DUDAS
*Director of the United States Patent and Trademark Office*